US011457179B2

United States Patent
Farzone et al.

(10) Patent No.: US 11,457,179 B2
(45) Date of Patent: Sep. 27, 2022

(54) CONTENT SECURITY FOR A VIDEO STREAM

(71) Applicant: Axis AB, Lund (SE)

(72) Inventors: Mazdak Farzone, Lund (SE); Axel Keskikangas, Lund (SE)

(73) Assignee: AXIS AB, Lund (SE)

( * ) Notice: Subject to any disclaimer, the term of this patent is extended or adjusted under 35 U.S.C. 154(b) by 527 days.

(21) Appl. No.: 16/552,830

(22) Filed: Aug. 27, 2019

(65) Prior Publication Data

US 2020/0106990 A1 Apr. 2, 2020

(30) Foreign Application Priority Data

Sep. 28, 2018 (EP) .................................... 18197599

(51) Int. Cl.
*H04N 7/167* (2011.01)
*H04L 9/08* (2006.01)
(Continued)

(52) U.S. Cl.
CPC .......... *H04N 7/1675* (2013.01); *G06V 20/41* (2022.01); *G06V 20/52* (2022.01); *H04L 9/0825* (2013.01); *H04L 9/0891* (2013.01); *G06V 20/44* (2022.01)

(58) Field of Classification Search
CPC .......... H04N 7/1675; H04N 21/26613; H04N 7/183; H04N 21/2347; G06V 20/41;
(Continued)

(56) References Cited

U.S. PATENT DOCUMENTS 7,508,941 B1    3/2009  O'Toole, Jr. et al.
2011/0080875 A1*  4/2011  Yang ...................... H04W 12/08
                                                              370/328
(Continued)

FOREIGN PATENT DOCUMENTS

CN          106254896 A        12/2016
WO      WO-2010151665 A1 *    12/2010    ............. H04H 60/22
WO      WO-2017083311 A  *     5/2017    ............. G06F 21/10

OTHER PUBLICATIONS

Chinese Office Action dated Sep. 23, 2021 for Chinese Patent Application No. 201910885927.0.
(Continued)

*Primary Examiner* — Mohammad W Reza
(74) *Attorney, Agent, or Firm* — Volpe Koenig (57) ABSTRACT

A video capturing device configured to capture video data, the image capturing device comprising: an image processing pipeline configured to generate a video stream from the captured video data; an encryption key activating module configured to, upon request, activate an encryption key and deactivate any previously activated encryption key used for encrypting the video stream, such that only one encryption key is activated to be used for encryption of the video stream at each instance in time; an encryption scheduler module configured to, at a predetermined time interval, instruct the encryption key activating module to activate an encryption key; an event handling module configured to, as a response to receiving indications of a detected event, instruct the encryption key activating module to activate an encryption key; an encryption module configured to encrypt the video stream using the one activated encryption key.

19 Claims, 3 Drawing Sheets

(51) Int. Cl.
*G06V 20/40* (2022.01)
*G06V 20/52* (2022.01)

(58) Field of Classification Search
CPC ...... G06V 20/52; G06V 20/44; H04L 9/0825; H04L 9/0891; H04L 9/088; G08B 13/19617
See application file for complete search history.

(56) References Cited

U.S. PATENT DOCUMENTS

| | | |
|---|---|---|
| 2012/0195425 A1 | 8/2012 | Kim et al. |
| 2014/0237243 A1* | 8/2014 | Ma ............... H04N 21/8456 713/168 |
| 2017/0064408 A1 | 3/2017 | Ketola et al. |

OTHER PUBLICATIONS

Extended European Search Report dated Mar. 11, 2019 for the European Patent Application No. 18197599.6.

\* cited by examiner

CONTENT SECURITY FOR A VIDEO STREAM

TECHNICAL FIELD

The present invention relates to the field of encryption of a video stream, and more particular to a device which handles activation and deactivation of encryption keys for encrypting the video stream.

BACKGROUND

Content security for captured video data is getting increasingly important, as devices capturing video data in public spaces are getting more frequently used. Privacy and integrity of people being filmed in public places is one of the reasons for the often though regulations applied to installing security cameras, or the use of body warn cameras (BWC) by law enforcement personnel. For privacy and security reasons it is important to restrict access to the video data using encryption of the video data, both for limiting which users that are allowed access to the decrypted video data, and for limiting which parts of the captured video data that a user can decrypt. This may be done by only allowing certain users to obtain encryption key(s) used for encryption of the video data, and encrypt only certain parts of the video data using the encryption keys which certain users have access to. For example, an owner of a security camera installed at home may want a fire department to access a video feed of their home only during the event of a fire. US 2017/0064408 (Teleste Oyj) discloses such a system where a triggering event results in a change of encryption key for encrypting the captured video, which encryption key is only made available to specific users. A problem with this solution may be that in some cases, video data not being encrypted differently (i.e. using a new encryption key) due to a detected event still must be decrypted and viewed, which still may lead to privacy problems when it comes to accessing such video data which may comprise intrusive content not related to the reason for decryption. Moreover, in case an encryption key is stolen, this may lead to possibilities of decrypting vast amount of video data for an unauthorized user.

There is thus a need for improvements within this context.

SUMMARY

In view of the above, overcoming or mitigating at least some of the problems discussed above would be desirable. In particular, it is an object to provide a device which handles activation and deactivation of encryption keys for encrypting a video stream generated from captured video data, to reduce the risk of decryption of intrusive video data by users which should not be allowed to, or have no reason to, watch the video data.

According to a first aspect, there is provided a video capturing device configured to capture video data, the image capturing device comprising:

an image processing pipeline configured to generate a video stream from the captured video data;

an encryption key activating module configured to, upon request, activate an encryption key and deactivate any previously activated encryption key used for encrypting the video stream, such that only one encryption key is activated to be used for encryption of the video stream at each instance in time;

an encryption scheduler module configured to, at a predetermined time interval, instruct the encryption key activating module to activate an encryption key;

an event handling module configured to, as a response to receiving indications of a detected event, instruct the encryption key activating module to activate an encryption key;

an encryption module configured to encrypt the video stream using the one activated encryption key.

Implementing activation of encryption keys for encrypting the video stream on regular intervals in conjunction with the possibility of forcing activation of an encryption key as a response to a detected event will reduce the risk of a user getting unauthorized access to video, e.g. video which is not relevant for the purpose for which the user was allowed access. For example, by changing the encryption key every fifth minute, any user which gets (unauthorized) access to a certain encryption key may only decrypt five minutes of video, which reduces the amount of decrypted video ending up in the wrong hands. Moreover, by also forcing a change of encryption key on a detected event, the amount of irrelevant video (for the event) which legitimate users for decrypting the video stream during that event is accessing is also reduced. For example, if the encryption key is changed every third minute (initiated by the encryption scheduler module), and the event takes place in the last minute, a system where an event does not trigger a change of encryption key would result in that a legitimate user for decoding the video stream during that event also would access the two minutes of the video stream prior to that event was detected. As described hereinafter the possibilities of decrypting irrelevant (for the viewer) video data is reduced.

As used herein, by "image processing pipeline" is generally meant a unit which takes raw video data (captured by an image sensor of the video capturing device) as input, and produces a video stream from such video data. For example, the video data may be encoded into a video stream (video, etc.,) having a standard format such as H.264. In some embodiment, the image processing pipeline may produce a plurality of video streams from the video data, which for example may be encoded differently, stored differently (i.e. in a local memory and streamed to a separate server for storage), encrypted differently, etc.

As used herein, by "video stream" is generally meant a plurality of temporally consecutive image frames, wherein each image frame corresponds to a raw video data captured by the image sensor of the video capturing device. The image frames may be encoded using video codecs such as H.264, MPEG etc., and if applicable an image frame of the video stream may be encoded into an I-frame, P-frame, or B-frame. The image frames of the video stream may in some embodiments not be encoded, but instead comprise the raw video data. Generally, a video stream comprises a plurality of image frames, each associated with a time stamp, and ordered according to the associated time stamps. A video stream may be stored as a video file.

As used herein, by "receiving indications of a detected event" is generally meant receiving any type of data which the event handling module can interpret as an event being detected. The data may comprise only a Boolean or another data type (string, integer) indicating that an event has been detected. The data may further comprise indication(s) of which type of event that has been detected. The indications may be received from an internal and/or external sensor which is configured to transmit such indications to the video capturing device.

According some embodiments, the encryption scheduler module is configured to, at the predetermined time interval from an immediately preceding request to the encryption key activating module to activate an encryption key, instruct the encryption key activating module to activate an encryption key.

Consequently, the changing of encryption keys initiated by the encryption scheduler module at a predetermined interval may be offset because of a detected event (which initiated a change of encryption key). For example, if the encryption scheduler module initiates a change of encryption every fourth minute, e.g. at minute 0, 4, 8, and an event is detected three minutes in to such an interval, e.g. at minute 11, the next initiated change of encryption key from the encryption scheduler module will take place at minute 15, and then at minute 19 etc. This embodiment is also applicable on changes of encryption keys initiated for other reasons, as will be exemplified below. Using this embodiment, the regular interval (e.g. every fourth minute) for changing the encryption key is maintained, even though an event is detected in the middle of such an interval. Advantageously, this further reduces the risk of a user getting unauthorized access to video as well as provides predictable changes of encryption keys.

According to some embodiments, the video capturing device further comprises a buffer memory for temporally storing the video stream for a first predetermined period of time before the encryption module encrypts the video stream. By using such buffer, the changing of an encryption key on e.g. a detected event will take place (in the video stream) before the actual event is detected. For example, if the first predetermined period of time is 20 seconds, and if the event is detected at t=3 minutes and 35 seconds, which results in a change of encryption key, the video stream will be encrypted using that encryption key from 3 minutes and 15 seconds into the video stream, due to the buffering of 20 seconds. Consequently, any latency between the actual detection of the event (i.e. a fire alarm) to the change of the encryption key will be handled, such that the video stream encrypted by that encryption key will include the start of the detected event.

The first predetermined period of time may be any suitable interval such as 10 seconds, 20 seconds, or 40 seconds. The first predetermined period of time may according to some embodiments be determined based on a size of the buffer memory and a bit rate of the video stream.

According to some embodiments, the video capturing device further comprises a non-volatile memory, wherein the image capturing device is configured to store the encrypted video stream in the non-volatile memory. Advantageously, (high speed) internet connectivity of the video capturing device is not needed, since the captured video is locally stored. This facilitates cheaper and less complex video capturing devices. As described herein, content security is still achieved, despite any increased risk of the encrypted video stream ending up in the wrong hands due to the local storage.

According to some embodiments, the event handling module is further configured to instruct the encryption key activating module to disregard any request to activate an encryption key for a second predetermined period of time and thereafter instruct the encryption key activating module to activate another encryption key. Consequently, the length of the interval in the video stream where an encryption key is used as a result to a detected event may be specifically decided and need not to be the same as the interval of the encryption scheduler module. The second predetermined interval may be based on a type of a detected event. For example, a detected event indicating a car crash may result in an interval of 20 seconds while a detected event indicating a burglary may result in an interval of 5 minutes. Advantageously, the flexibility of the handling of encryption keys is increased, which may result in a better adapted handling based on different types of detected event for further improving the security and privacy aspects.

According to some embodiments, the event handling module is further configured to receive indications of a same detected event during a period of time exceeding a threshold period of time, and to instruct the encryption key activating module to disregard any request to activate an encryption key at least during the period of time when the same event is detected and thereafter instruct the encryption key activating module to activate another encryption key. Consequently, for events that can be detected during a period of time, such as a fire alarm, motion detection in video data, etc., the handling of encryption keys can be specifically adjusted such that one encryption key is used for encryption of an entire detected same event (optionally including a buffer period before the event takes place as described above) and that the encryption key is changed when the event is no longer detected. To compensate for the use of any buffer period before the event, and/or to compensate for a too early end of the detected event, a buffer period may be employed also at the end of the event such that the another encryption key is activated at the end of the event plus an additional period of time.

According to some embodiments, the indication of a detected event received by the event handling module originates from a video analyzer arranged to analyze image content of the video stream. The video analyzer may be internal to the video capturing device as well as external to the video capturing device. In many monitoring applications, events are detected based on the image content of the captured video (motion detection, face recognition etc.), and in this embodiment, the handling of encryption keys is advantageously adapted for such applications.

According to some embodiments, the indication of a detected event received by the event handling module originates from at least one from the list of: activation of a switch mechanism in connection with the image capturing device (e.g. a button that is pressed), analysis of audio content of the video stream, analysis of audio content recorded at a scene captured by the video capturing device, detection of a changed connection status of a GPS functionality of the image capturing device, detection of a changed connection status of a cellular network functionality of the image capturing device, detection of a changed connection status of a Wi-Fi functionality of the image capturing device, a signal from a gyroscope of the image capturing device, and a signal from a wired or wireless connected external sensor.

The indication of the detected event may thus happen for many different reasons, and the actual detection of the event may be done both internally at the video capturing device, as well as externally. Consequently, according to some embodiments, the video capturing device comprises an event detector module, wherein the indication of a detected event is received by the event handling module from the event detector module. Alternatively, or additionally, the video capturing device is further connected (wired or wireless) to external sensor for detecting events, wherein the indication of a detected event is received by the event handling module from the external sensor.

According to some embodiments, the predetermined time interval used by the encryption scheduler module is more than 1 minute, preferably more than 3 minutes, and most preferably 5 minutes. The functionality of forcing a change of encryption key at detected events allows for longer regular intervals for changing the encryption key and still provide sufficient content security. Prolonging the regular cycle for using the same encryption key reduces the computational complexity at the video recording device, which is in particular important at smaller lightweight devices such as BWCs or dashboard cameras. Using an interval of 5 minutes may be advantageous since this conforms the encrypted video to the Matroska multimedia container format, which may be considered as industry standard practice.

According to some embodiments, the encryption key activating module is configured to generate an encryption key when being instructed to activate an encryption key. Consequently, the flexibility of the encryption key handling is increased and an encryption key may never need to be reused for encryption.

According to some embodiments, a plurality of encryption keys is stored in memory of the video capturing device, and wherein the encryption key activating module is configured to select an encryption key to be activated from the stored plurality of encryption keys. This reduces the computational complexity at the video capturing device. Moreover, this removes any need of retrieving the encryptions keys from an external device (i.e. wireless from a server) while capturing video data, but instead the encryption keys may be stored in the video capturing device in advance.

According to some embodiments, the image capturing device is further configured to: encrypt activated encryption keys using a public key of an asymmetric key pair, and store the encrypted activated key in memory of the video capturing device together with a key-id of the activated encryption key and a time-stamp indicating where in the encrypted video stream the activated encryption key is used for encryption. The private key may in this embodiment be kept at a Key management system (KMS), which may decrypt the encrypted encryption keys and provide access to relevant encryption keys (using the time stamps associated with the encryption keys) to the users that are entitled to watch the video stream at these time stamps. Advantageously, content security is increased. It should be noted that other types of encryption of the encryption keys may be employed. For example, in one embodiment, the encryption keys are encrypted using a symmetric key with shared secret (e.g. shared with the KMS).

According to some embodiments, the image capturing device is a body worn camera, BWC, or a dashboard camera. Such devices often have limited processing power and a limited battery time, and procedure of changing encryption key to often requires more overhead for the device, leading to less operational time. As discussed above, the regular interval for changing encryption key (i.e. as handled by the encryption scheduler module) can be kept rather long (e.g. more than a minute) since the event handling module anyway will initiate a change of encryption key upon receiving indications of a detected event.

BRIEF DESCRIPTION OF THE DRAWINGS

The above, as well as additional objects, features and advantages will be better understood through the following illustrative and non-limiting detailed description of preferred embodiments, with reference to the appended drawings, where the same reference numerals will be used for similar elements, wherein.

DETAILED DESCRIPTION OF EMBODIMENTS

The present teachings will now be set forth more fully hereinafter with reference to the accompanying drawings, in which embodiments are shown. The systems and devices disclosed herein will be described during operation.

In reducing the risk of unauthorized access to a video stream, one solution may be to encrypt a memory where the video stream is stored. However, the level of security for such a solution may be considered insufficient. To further reduce the risk of unauthorized access to the video stream, the video stream may be encrypted, using encryption keys. To increase the level of security, different portions of the video stream may be encrypted using different encryption keys. FIGS. 1-5 shows different schemes for changing an encryption key used for encryption of a video stream.

It should be noted that the below examples only discuss encryption of a video stream. However, the present disclosure is equally suitable for being used on an audio stream (i.e. captured by a microphone), or a combination of a video and an audio stream.

Figure 1:
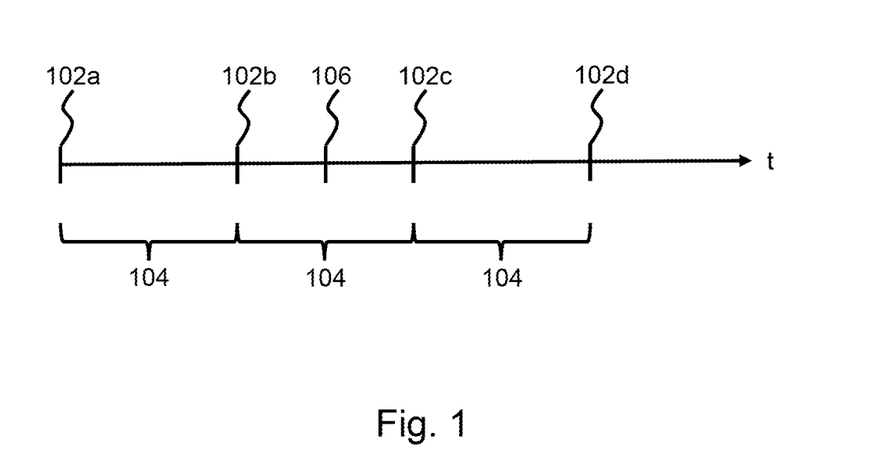
FIG. 1 shows a timeline where encryption keys used for encrypting a video stream is changed according to a first embodiment.

FIG. 1 shows a timeline, t, where encryption keys used for encrypting a video stream is changed according to a first embodiment. At a first point in time, 102*a*, a first encryption key is activated, and any previously activated encryption keys are deactivated, such that only one encryption key is activated to be used for encryption of the video stream at each instance in time. In this embodiment, an encryption scheduler module initiates the activation of the first encryption key. The encryption scheduler module represents a functionality of the video capturing device which ensures that the encryption key used for encrypting the video stream is changed at regular intervals, at least when an event is not detected, which will be further described below. The encryption scheduler module is thus configured to, at predetermined time intervals, initiate a change of encryption key. The actual change of the active encryption key made at the first point in time 102*a* is performed by an encryption key activating module configured to, upon request, activate an encryption key and deactivate any previously activated encryption key used for encrypting the video stream, such that only one encryption key is activated to be used for encryption of the video stream at each instance in time. It should be noted that the encryption key activating module is performing all activations/deactivations of the encryption key described herein, unless otherwise mentioned. The encryption key activating module is further described below.

At a second point in time, 102*b*, a second encryption key is activated and the first encryption key is deactivated. The encryption scheduler module also initiates this change of encryption key. The second point in time 102*b* is at the predetermined interval 104 from the first point in time 102*a*.

At a third point in time 106, an event is detected and indication thereof is received by an event handling module, which results in that a third encryption key is activated. The event handling module represents functionality at the video capturing device that, in response to a detected event, initiate activation of a new encryption key for encrypting the video stream. At a fourth point in time, 102c, a fourth encryption key is activated, initiated by the encryption scheduler module at the predetermined interval 104 from the second point in time 102b, where the encryption scheduler module last initiated a change of encryption key. Similarly, a fifth decryption key is activated at a fifth point in time 102d by the encryption scheduler module. In this embodiment, the second encryption key is thus used for an interval of time between the second point in time 102b and the third point in time 106. The third encryption key is used for an interval of time between the third point in time 106 and the fourth point in time 102c. Notable, to be able to decrypt the video stream from the detected event, the third encryption key is needed, which cannot be used for decrypting the video stream prior to the detected event (i.e. prior to the third point in time 106), and cannot be used for decrypting the video stream after the fourth point in time 102c. Consequently, no irrelevant video (for the event) happening before the event may be accessed/decrypted by a legitimate user for decrypting the video stream during that event.

It should be noted that the first, second, third, fourth and fifth encryption keys mentioned above (and similar for the encryption keys discussed in conjunction with FIGS. 2-5 below) may all be different from each other according to some embodiments. This may further reduce the risk of unauthorized access to the decrypted video stream. Alternatively, some encryption keys may be reused, for efficiency reasons. However, two encryption keys used for subsequent intervals in the video stream may not be the same encryption key.

The encryption keys used may be a symmetric key, for reducing the complexity of the decryption process. The symmetric key is made available to for example an external Key management system (KMS). According to other embodiments, the encryption keys used may be part of asymmetric key pairs, i.e. a public key of a key pair, where the private key of that key pair is made available to for example the KMS. In yet another embodiment, the encryption key is a symmetric key which after being used is encrypted using a public key of an asymmetric key pair, where the private key of that key pair is made available to for example the KMS. The encrypted encryption keys are then made available to the KMS in conjunction with the encrypted video stream, i.e. via metadata. This will be further elaborated on below.

The predetermined interval 104 may be any suitable interval such as 30 seconds, 2 minutes, 4 minutes, 10 minutes. Advantageously, the present teachings allow for longer intervals, since the combination of encryption key rotation at regular intervals 104 and changing encryption key at a detected event reduces the risk of unauthorized decryption of video representing events or other interesting occurrences in the video stream. An alternative may be to change encryption key at shorter intervals, e.g. every five seconds. However, the drawback of such a solution is that it requires more overhead, more processing power, which may result in much less operational time due to battery constraints of the video capturing device and an increased complexity of providing legitimate users with the correct decryption keys for a certain interval of time of the video stream.

Figure 2:
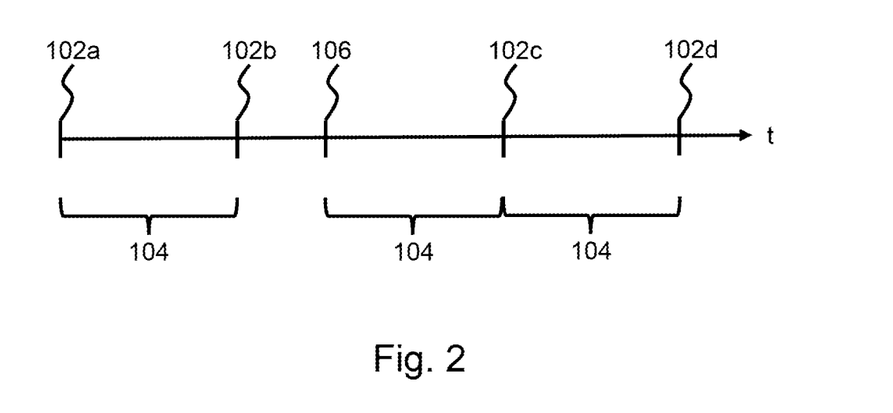
FIG. 2 shows a timeline where encryption keys used for encrypting a video stream is changed according to a second embodiment.

FIG. 2 shows a timeline, t, where encryption keys used for encrypting a video stream is changed according to a second embodiment. At a first point in time, 102a, a first encryption key is activated, and any previously activated encryption key are deactivated, such that only one encryption key is activated to be used for encryption of the video stream at each instance in time. In this embodiment, the encryption scheduler module initiates the activation of the first encryption key. At a second point in time, 102b, a second encryption key is activated and the first encryption key is deactivated. The encryption scheduler module also initiates this change of encryption key. The second point in time 102b is at the predetermined interval 104 from the first point in time 102a. At a third point in time 106, an event is detected and indication thereof is received by an event handling module, which results in that a third encryption key is activated. Unlike the embodiment shown in FIG. 1, in this embodiment, the encryption scheduler module is configured to, at the predetermined time interval from an immediately preceding change of the activated encryption key, initiate a further change of the activated encryption key. Consequently, the encryption scheduler module will initiate a change of encryption key, from the third encryption key to a fourth encryption key, at the predetermined interval 104 from the third point in time 106, at a fourth point in time 102c. Consequently, the changing of encryption keys initiated by the encryption scheduler module at predetermined intervals 104 may be offset because of a detected event (which initiated a change of encryption key to the third encryption key), as shown in FIG. 2. Similarly, a fifth decryption key is activated at a fifth point in time 102d by the encryption scheduler module.

Figure 3:
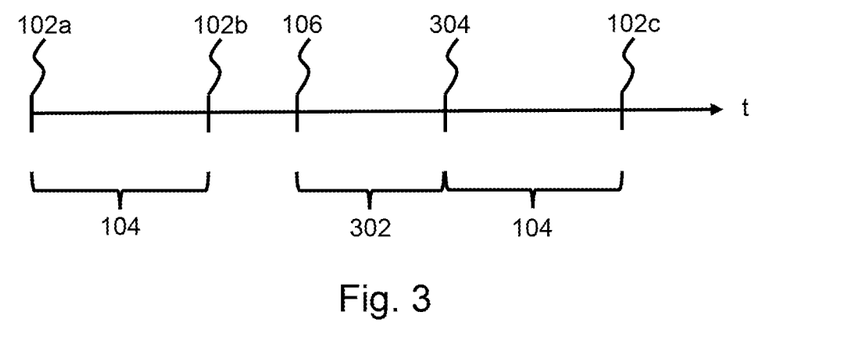
FIG. 3 shows a timeline where encryption keys used for encrypting a video stream is changed according to a third embodiment.

FIG. 3 shows a timeline, t, where encryption keys used for encrypting a video stream is changed according to a third embodiment. The two first encryption keys are activated as discussed in conjunction with FIG. 1-2 above. At a third point in time 106, an event is detected and indication thereof is received by an event handling module, which results in that a third encryption key is activated. Unlike the embodiment shown in FIG. 1-2, the detected event at the third point in time 106 results in that the third encryption key is activated for a second predetermined period of time 302. Moreover, at the end of the second predetermined period of time 302, i.e. at a fourth point in time 304, the event handling module or encryption scheduler module (e.g. in an event mode) is further configured to initiate activation of a fourth encryption key. Consequently, in this embodiment, the event handling module represent functionality at the video capturing device that, as a response to a detected event, initiate activation of a new encryption key for encrypting the video stream (i.e. at the third point in time 106), keep that encryption key activated for a second predetermined period of time 302, and then initiates activation of another encryption key (i.e. at the fourth point in time 304). In order to ensure that one encryption key is kept activated for the second predetermined period of time 302, the event handling module is further configured to instruct the encryption key activating module to disregard any request to activate an encryption key for the second predetermined period of time. If such instruction is received by the encryption key activating module, such instruction thus takes precedence over an instruction from the encryption scheduler module. The second predetermined period of time 302 may in some embodiments be based on a type of event that is detected. For example, the indications of a detected event received by the event handling module may comprise data indicating what type of event that is detected, wherein the video capturing device may comprise a look up table (in memory) specifying the period of time 302 that should be used for this type of event. In other embodiments, the indications of a detected event received by the event handling module may comprise data indicating an estimated period of time for the duration of the event, which then may be used for setting the second predetermined point of time. In yet other embodiments, a preset period of time 302 is used no matter what type of events that is detected, or as a fallback in case the event type cannot be determined or is not associated with a certain period of time. In this embodiment, the amount of irrelevant video (for the event) happening after the detected event that may be accessed by that legitimate user may be reduced.

Next, the encryption scheduler module will initiate a change of encryption key, from the fourth encryption key to a fifth encryption key, at the predetermined interval 104 from the fourth point in time 304, at a fifth point in time 102c.

In an alternative embodiment, the encryption scheduler module will initiate a change of encryption key, from the fourth encryption key to a fifth encryption key, at the first repetition of the predetermined interval 104 when a request 509 from the encryption scheduler is not disregarded, at a fifth point in time.

Figure 4:
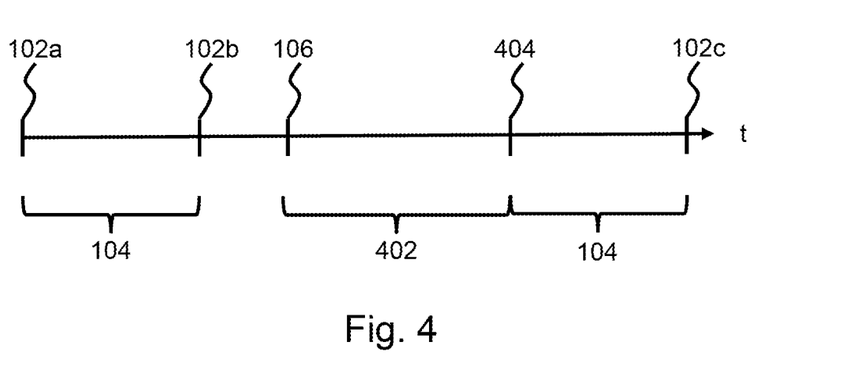
FIG. 4 shows a timeline where encryption keys used for encrypting a video stream is changed according to a fourth embodiment.

FIG. 4 shows a timeline, t, where encryption keys used for encrypting a video stream is changed according to a fourth embodiment. The two first encryption keys are activated as discussed in conjunction with FIG. 1-3 above. At a third point in time 106, an event is detected and indication thereof is received by an event handling module, which results in that a third encryption key is activated. Unlike the embodiments shown in FIG. 1-3, in this embodiment, the event handling module is further configured to receive indications of a same detected event during a period of time 402 exceeding a threshold period of time. This results in that the third encryption key is activated for the period of time 402. Moreover, at the end of the period of time 402, i.e. at a fourth point in time 404, the event handling module is further configured initiate activation of a fourth encryption key. Consequently, in this embodiment, the event handling module represent functionality at the video capturing device that, as a response to a detected event, initiate activation of a new encryption key for encrypting the video stream (i.e. at the third point in time 106), keep that encryption key activated as long as the event is still detected, and then initiates activation of another encryption key at the end of the event or similar (i.e. at the fourth point in time 404). In order to ensure that one encryption key is kept activated for as long as the event is still detected, the event handling module is further configured to instruct the encryption key activating module to disregard any request to activate an encryption key for as long as the event is still detected. If such instruction is received by the encryption key activating module, such instruction thus takes precedence over an instruction from the encryption scheduler module. In this embodiment, the amount of irrelevant video (for the event) happening after the detected event that may be accessed by that legitimate user may be reduced.

In case the indications of a same detected event during a period of time 402 does not exceed the threshold period of time, any other embodiment described herein for determining the activation time span for the third encryption key may be employed.

Next, the encryption scheduler module will initiate a change of encryption key, from the fourth encryption key to a fifth encryption key, at the predetermined interval 104 from the fourth point in time 404, at a fifth point in time 102c.

In an alternative embodiment, the encryption scheduler module will initiate a change of encryption key, from the fourth encryption key to a fifth encryption key, at the first repetition of the predetermined interval 104 when a request 509 from the encryption scheduler is not disregarded, at a fifth point in time.

Figure 5:
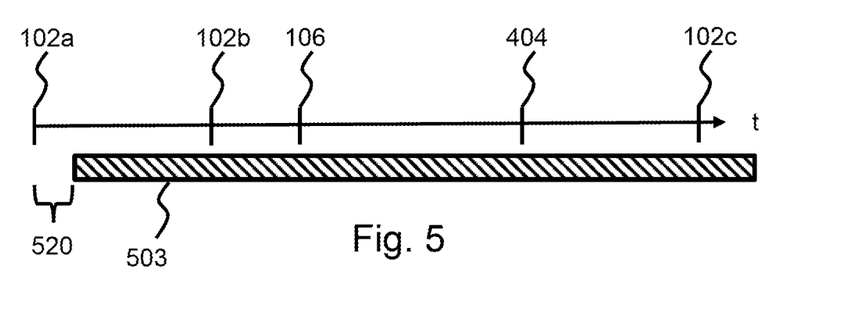
FIG. 5 shows a timeline where encryption keys used for encrypting a video stream is changed according to a fifth embodiment.

FIG. 5 shows a timeline, t, where encryption keys used for encrypting a video stream 503 is changed according to a fifth embodiment, as described above in conjunction with FIG. 4. In this embodiment, the video capturing device comprises a buffer memory for temporally storing the video stream for a first predetermined period of time 520 before the video stream is encrypted. In other words, the point in time in the video stream 503 where a certain encryption key is activated is offset with the first predetermined period of time 520. Consequently, any latency between the actual detection of the event (i.e. a fire alarm) to the change of the encryption key will be mitigated, such that the video stream encrypted by that third encryption key 106 will include the start of the detected event. In some embodiments, where the end of the event is known (as described in conjunction with FIG. 4) or predicted (as described in conjunction with FIG. 3), the offset may need to be reset at the end of the event, such that the encryption key activated during the event is used to encrypt the video stream during the entire event.

Figure 6:
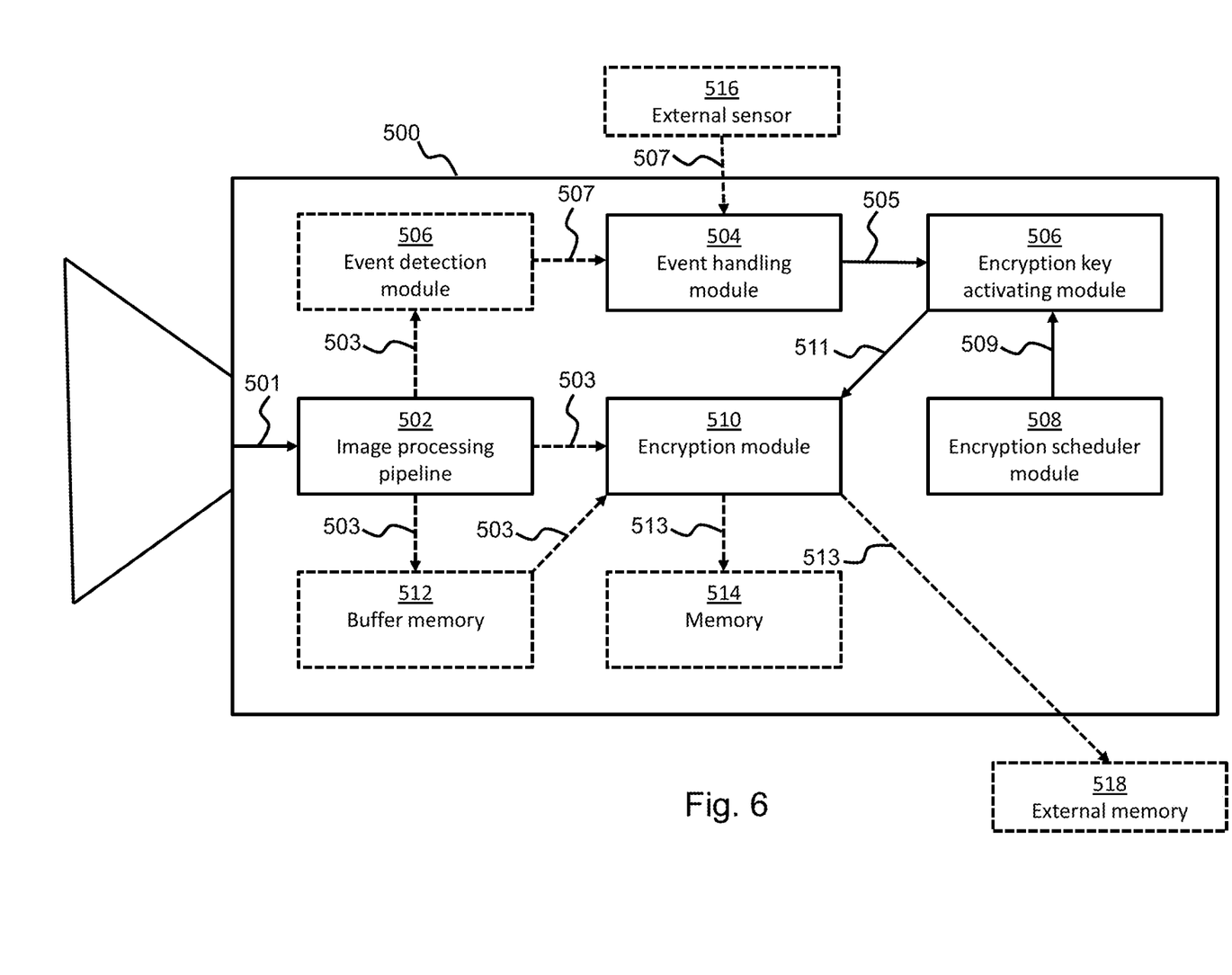
FIG. 6 shows a schematic video capturing device according to embodiments.

FIG. 6 shows by way of example a schematic drawing of a video capturing device 500. The video capturing device 500 is configured to capture video data 501, i.e. from a surrounding scene. The video data 501 is received by an image processing pipeline 502 configured to generate a video stream 503 from the captured video data 501. The image processing pipeline may be embodied by a ARTPEC chipset produced by Axis Communication AB. Any other suitable chipset or software may be used. It should be noted that the image processing pipeline may generate several video streams 503 from the same video data 501. In this description, when a single activated encryption key is discussed, it should be understood that a single encryption key is activated for a particular video stream, but that a plurality of encryption keys may be activated in case a plurality of video streams is encoded as described herein.

The video capturing device further comprises encryption key activating module 506 configured to, upon request 505, 509, activate an encryption key and deactivate any previously activated encryption key used for encrypting the video stream 503, such that only one encryption key is activated to be used for encryption of the video stream at each instance in time.

The video capturing device 500 further comprises an encryption scheduler module 508 configured to, at predetermined time intervals, instruct 509 the encryption key activating module 506 to activate an encryption key.

The video capturing device 500 further comprises an event handling module 504 configured to, as a response to receiving indications 507 of a detected event, instruct 505 the encryption key activating module 506 to activate an encryption key.

The encryption key activating module 506 is configured to communicate the currently activated encryption key 511 for the video stream 503 to an encryption module 510, which is configured encrypt the video stream 503 using the one activated encryption key 511.

The encryption key activating module 506 may further be configured to notify the encryption scheduler module 508 whenever a request to activate an encryption key occurs. In one embodiment, the encryption key activating module 506 is configured to notify the encryption scheduler module 508 whenever it is instructed 505 by the event handling module 504 to activate an encryption key.

The encrypted video stream 513 may in some embodiments be transmitted (e.g. streamed) to an external memory 518 for storage. In some embodiments, the video capturing device 500 comprises a non-volatile memory 514, wherein the image capturing device is configured to store the encrypted video stream 513 in the non-volatile memory 514. The non-volatile memory 514 may in turn be encrypted for improving security.

The video capturing device 500 may further comprise a connectivity interface (not shown) for wired or wireless connection to another device, e.g. for downloading a stored video stream from the memory 514, or uploading encryption keys to the video capturing device 500, etc.

In some embodiments, the encryption module receives the video stream 503 from the image processing pipeline 503 directly for real-time encryption. In other embodiments, the video capturing device 500 comprises a buffer memory 512 for temporally storing the video stream for a first predetermined period of time before transmitting the video stream 503 to the encryption module 510 for encryption the video stream 503.

The event handling module 504 may receive the indications 507 of a detected event from an external sensor 516 and/or from an internal event detection module 506. In some embodiments, the indication 507 of a detected event received by the event handling module 504 originate from a video analyzer arranged to analyze image content (i.e. motion detection, face recognition etc.) of the video stream 503. The video analyzer may be implemented internally, i.e. implemented by the event detection module 506, or externally, by the external sensor 507 (which in this case must have access to the video stream 503, not shown in FIG. 6). The indications 507 of a detected event may originate from a plurality of different sources and reasons, for example at least one from the list of:

activation of a switch mechanism (i.e. button etc.) in connection with the image capturing device 500,
analysis of audio content of the video stream 503,
analysis of audio content (e.g. voice commands) recorded at a scene captured by the video capturing device 500, i.e. captured by an internal or external microphone,
detection of a changed connection status of a GPS functionality of the image capturing device 500,
detection of a changed connection status of a GPRS functionality of the image capturing device 500,
detection of a changed connection status of a Wi-Fi functionality of the image capturing device 500,
a signal from a gyroscope of the image capturing device 500,
and a signal from a wired or wireless connected external sensor 516.

Reasons for implementing any of, or a plurality of, the above discussed examples may vary. For example, a video capturing device 500 moving from an outdoor position to an indoor position (resulting in e.g. a changed connection status of a GPS functionality of the image capturing device) may indicate an event that should be encoded in the video stream using a new encryption key. In this embodiment, moving the video capturing device 500 from the indoor position to the outdoor position again may indicate the end of the "indoor event", resulting in activation of another encryption key.

The encryption keys to be used for encryption by the image capturing device 500 may be accessible to the encryption module in different ways. In some embodiments, the encryption key activating module is configured to generate an encryption key when being instructed to activate an encryption key. In other embodiments, a plurality of encryption keys is stored in memory 514 of the video capturing device, and wherein the encryption key activating module is configured to select an encryption key to be activated from the stored plurality of encryption keys. The handling of the encryption keys is thus system dependent. Below follow two examples of how the encryption keys may be generated and handled.

1) The video capturing device 500 is receiving a public key, PK, of an asymmetric key pair known to the systems key management server (KMS). The video capturing device 500 generates symmetric encryption keys, SKs, by sampling a random number generator. The video stream 503 is then encrypted using the SKs and the SKs are encrypted using the PK and the encrypted SKs are stored as metadata for the encrypted video stream 513. Alternatively, the metadata (including the SKs used for encrypting the video stream) may be encrypted using the PK. In another embodiment, the metadata (including all SKs used for encrypting the video stream) is encrypted using another SK (i.e. not necessarily used for encrypting the video stream) which then is encrypted with a PK.

The SKs are then destroyed which means only the key management server can access the video (and delegate authority to decrypt as needed). In this embodiment, the video capturing device 500 may thus be configured to encrypt activated encryption keys using a public key of an asymmetric key pair, and store the encrypted activated key in memory 514 of the video capturing device 500 together with a key-id of the activated encryption key and a time-stamp indicating where in the encrypted video stream the activated encryption key is used for encryption.

2) The KMS issues a plurality of symmetric keys (key-ring) together with a key-id for each encryption key, and store these in the video capturing device 500. The video capturing device 500 encrypts the video stream 503 by using encryption keys from the keyring and a used (activated) key-id is stored as metadata for the encrypted video stream 513 along with a time-stamp indicating where in the encrypted video stream 513 the activated encryption key is used for encryption. The keyring is destroyed at the video capturing device 500. When someone requires access for decryption of a certain time span of the encrypted video stream 513, this may be achieved by providing the KMS with a camera-id and key-id, and thus get the corresponding key and access for decryption.

The content of this disclosure may be implemented in any type of image capturing devices. In one embodiment, the image capturing device is a wearable camera such as body worn camera, BWC. In another embodiment, the image capturing device is a stationary video camera such as a monitoring camera. In yet another embodiment, the image capturing device is a dashboard camera, e.g. installed in an emergency vehicle (police car, ambulance etc.).

The described embodiments may be advantageously used in the following two environments, which may be combined:

1) Secure low power/performance/connectivity video surveillance (e.g. a BWC or dashboard camera)
2) High privacy expectation surveillance environment (e.g. a camera installed at a police station, airport, embassy, hospital, elderly care facility etc.)

Further embodiments will become apparent to a person skilled in the art after studying the description above. Even though the present description and drawings disclose embodiments and examples, the disclosure is not restricted to these examples. Numerous modifications and variations can be made without departing from the scope of the present disclosure, which is defined by the accompanying claims. Any reference signs appearing in the claims are not to be understood as limiting their scope.

Additionally, variations to the disclosed embodiments can be understood and effected by the skilled person in practicing the disclosure, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The systems and methods disclosed hereinabove may be implemented as software, firmware, hardware, or a combination thereof. In a hardware implementation, the division of tasks between functional modules (e.g. encryption key activating module, encryption scheduler module, event handling module etc.) referred to in the above description does not necessarily correspond to the division into physical units; to the contrary, one physical component may have multiple functionalities, and one task may be carried out by several physical components in cooperation. Certain components/modules or all components/modules (e.g. an encryption key activating module, encryption scheduler module, event handling module etc.) may be implemented as software executed by a digital signal processor or microprocessor, or be implemented as hardware or as an application-specific integrated circuit (ASIC). Such software may be distributed on computer readable media, which may comprise computer storage media (or non-transitory media) and communication media (or transitory media).

The invention claimed is:

1. A video capturing device configured to capture video data comprising:
    an image processing pipeline configured to generate a video stream from the captured video data;
    an encryption key activating module configured to, upon request, activate an encryption key and deactivate any previously activated encryption key used for encrypting the video stream, such that only one encryption key is activated to be used for encryption of the video stream at each instance in time;
    an encryption scheduler module configured to, at a predetermined time interval, instruct the encryption key activating module to activate an encryption key;
    an event handling module configured to, as a response to receiving indications of a detected event, instruct the encryption key activating module to activate an encryption key and disregard any request to activate an encryption key for a second predetermined period of time and thereafter instruct the encryption key activating module to activate another encryption key;
    an encryption module configured to encrypt the video stream using the one activated encryption key.

2. The video capturing device of claim 1, wherein the encryption scheduler module is configured to, at the predetermined time interval from an immediately preceding request to the encryption key activating module to activate an encryption key, instruct the encryption key activating module to activate an encryption key.

3. The video capturing device of claim 1, further comprising a buffer memory for temporally storing the video stream for a first predetermined period of time before the encryption module encrypts the video stream.

4. The video capturing device of claim 1, further comprising a non-volatile memory, wherein the video capturing device is configured to store the encrypted video stream in the non-volatile memory.

5. The video capturing device of claim 1, wherein the event handling module is further configured to receive indications of a same detected event during a period of time exceeding a threshold period of time, and to instruct the encryption key activating module to disregard any request to activate an encryption key at least during the period of time when the same event is detected and thereafter instruct the encryption key activating module to activate another encryption key.

6. The video capturing device of claim 1, wherein the indication of a detected event received by the event handling module originate from a video analyzer arranged to analyze image content of the video stream.

7. The video capturing device of claim 1, wherein the indication of a detected event received by the event handling module originate from at least one from the list of: activation of a switch mechanism in connection with the video capturing device, analysis of audio content of the video stream, analysis of audio content recorded at a scene captured by the video capturing device, detection of a changed connection status of a GPS functionality of the video capturing device, detection of a changed connection status of a GPRS functionality of the video capturing device, detection of a changed connection status of a Wi-Fi functionality of the video capturing device, a signal from a gyroscope of the video capturing device, and a signal from a wired or wireless connected external sensor.

8. The video capturing device of claim 1, further comprising an event detector module, wherein the indication of a detected event is received by the event handling module from the event detector module.

9. The video capturing device of claim 1, further being connected to an external sensor for detecting events, wherein the indication of a detected event is received by the event handling module from the external sensor.

10. The video capturing device of claim 1, wherein the predetermined time interval is more than 1 minute, preferably more than 3 minutes, and most preferably 5 minutes.

11. The video capturing device of claim 1, wherein the encryption key activating module is configured to generate an encryption key when being instructed to activate an encryption key.

12. The video capturing device of claim 1, wherein a plurality of encryption keys is stored in memory of the video capturing device, and wherein the encryption key activating module is configured to select an encryption key to be activated from the stored plurality of encryption keys.

13. The video capturing device of claim 1 further configured to:
    encrypt activated encryption keys using a public key of an asymmetric key pair, and store the encrypted activated key in memory of the video capturing device together with a key-id of the activated encryption key and a time-stamp indicating where in the encrypted video stream the activated encryption key is used for encryption.

14. The video capturing device of claim 1, being a body worn camera, BWC, or a dashboard camera.

15. The video capturing device of claim 2, wherein the event handling module is further configured to instruct the encryption key activating module to disregard any request to activate an encryption key for a second predetermined period of time and thereafter instruct the encryption key activating module to activate another encryption key.

16. The video capturing device of claim 2, wherein the event handling module is further configured to receive indications of a same detected event during a period of time exceeding a threshold period of time, and to instruct the encryption key activating module to disregard any request to activate an encryption key at least during the period of time when the same event is detected and thereafter instruct the encryption key activating module to activate another encryption key.

17. A method for capturing video data, comprising:
    generating a video stream from the captured video data;
    upon request activating an encryption key and deactivating any previously activated encryption key used for encrypting the video stream, such that only one encryption key is activated to be used for encryption of the video stream at each instance in time;
    at a predetermined time interval, instructing the encryption key activating module to activate an encryption key;
    as a response to receiving indications of a detected event, instructing the encryption key activating module to activate an encryption key and disregard any request to activate an encryption key for a second predetermined period of time and thereafter instruct the encryption key activating module to activate another encryption key;
    encrypting the video stream using the one activated encryption key.

18. The method of claim 17, wherein at the predetermined time interval from an immediately preceding request to the encryption key activating module to activate an encryption key, instructing the encryption key activating module to activate an encryption key.

19. The method of claim 17, further comprising temporally storing the video stream for a first predetermined period of time before the encryption module encrypts the video stream.

* * * * *